UNITED STATES PATENT OFFICE 2,407,246

FLUORO-CHLORO HYDROCARBONS AND PROCESSES OF MAKING THEM

Anthony F. Benning, Woodstown, N. J., and Joseph D. Park, Wilmington, Del., assignors to Kinetic Chemicals, Inc., Wilmington, Del., a corporation of Delaware No Drawing. Application July 16, 1943, Serial No. 495,074

6 Claims. (Cl. 260—653)

A. This invention relates to the production of highly chlorinated fluorine-containing hydrocarbons.

B. It is an object of the invention to prepare solvents which are sufficiently inert to be used as such in a variety of reactions. It is another object of the invention to prepare new compounds which are useful as reaction media. A still further object of the invention is to prepare new compounds which are useful in the transference of heat. Another object of the invention is to prepare the new compounds by processes which are efficient yet relatively simple of manipulation.

C. The objects of the invention are accomplished, generally speaking, by preparing the compounds represented by the formulas $$CF_3CHClCCl_2CF_3 \text{ and } CF_3CCl_2CCl_2CF_3$$

The objects of the invention relating to process are accomplished by chlorinating the compound $CF_3CHClCH_2CF_3$, a liquid disclosed in U. S. application Serial No. 435,064 and in Example XXIV of U. S. application Serial No. 491,562 filed June 19, 1943, and claimed therein.

D. In carrying out our invention the compound $CF_3CHClCH_2CF_3$ was transformed to the vapor phase and mingled with elementary chlorine in the presence of water vapor and diffused sunlight. In order to accelerate the reaction, more intense heat and light may be admitted to the reaction chamber. A photoflood lamp is useful for this purpose.

E. The following example sufficiently illustrates the process.

*Example*

Twenty-four grams of $CF_3CHClCH_2CF_3$, having a boiling point between 35° and 36° C., and 9.8 grams of chlorine were placed in a 5-liter flask and the temperature raised until the compound was in the vapor phase. Water vapor and sunlight were admitted to the flask. After the reaction had reached substantial completion, a liquid product was obtained, which upon fractionation yielded the following compounds, which are characterized by their boiling points, melting points, molecular weights, and refractive index at 20° C. as follows:

| Compound | B. P. | M. P. | M. W. Calc. | M. W. Found | $N_D^{20}$ |
|---|---|---|---|---|---|
| | ° C. | ° C. | | | |
| $CF_3CHClCCl_2CF_3$ | 106 | -------- | 268 | 258 | 1.3660 |
| $CF_3CCl_2CCl_2CF_3$ | 136 | 83–84 | 304 | 275 | -------- |

The molecular weights were obtained by the freezing point depression method (cryoscopically). This method frequently gives molecular weights lower than theoretical when applied to hydrocarbons of the fluorinated type.

F. These compounds are useful as solvents for the reactants of particular processes, as reaction media and as heat-transfer media. Their stability is not extreme, but they are sufficiently inert to serve satisfactorily in these uses.

G. As many apparently widely different embodiments of this invention may be made without departing from the spirit and scope thereof, it is to be understood that we do not limit ourselves to the specific embodiments thereof except as defined in the appended claims.

We claim:

1. The compound representd by the formula $CF_3CCl_2CCl_2CF_3$.

2. The compound represented by the formula $CF_3CHClCCl_2CF_3$.

3. The process of producing the compounds of claim 4 which comprises contacting $$CF_3CHClCH_2CF_3$$

with elementary chlorine in the vapor phase in light.

4. The compounds represented by the formula $CF_3CXClCCl_2CF_3$, in which X is one of the group consisting of H and Cl.

5. The process of preparing compounds of the type represented by the formula of claim 4 which comprises mixing $CF_3CHClCH_2CF_3$ with chlorine and water vapor in the presence of light.

6. A liquid product comprising a mixture of $CF_3CCl_2CCl_2CF_3$ and $CF_3CHClCCl_2CF_3$.

ANTHONY F. BENNING.
JOSEPH D. PARK.